M. G. ALBROOK.
GEARING.
APPLICATION FILED DEC. 30, 1918.
1,333,364.
Patented Mar. 9, 1920.
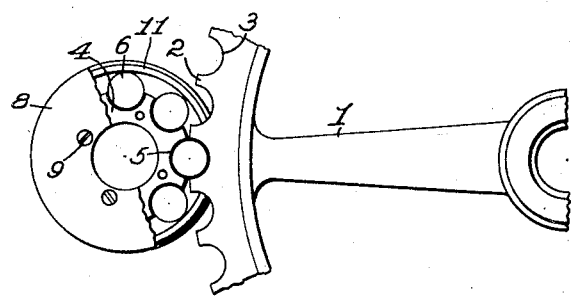
INVENTOR.
M. G. Albrook,
BY G. C. Kennedy,
ATTORNEY.

UNITED STATES PATENT OFFICE.

MOREL G. ALBROOK, OF DELHI, IOWA.

GEARING.

1,333,364.  Specification of Letters Patent.  Patented Mar. 9, 1920.

Application filed December 30, 1918. Serial No. 268,854.

*To all whom it may concern:*

Be it known that I, MOREL G. ALBROOK, a citizen of the United States of America, and a resident of Delhi, Delaware county, Iowa, have invented certain new and useful Improvements in Gearing, of which the following is a specification.

My invention relates to improvements in gearing, and the object of my improvement is to supply a gearing element with roller-bearing or frictionless cogs adapted to enmesh with teeth of a special type on another gearing element to drive the latter without binding, said improved gearing elements possessing other features of superiority over the ordinary forms of toothed gears, as will be more specifically described hereinafter and pointed out in the claims.

The above object I have effected by the means which are hereinafter described and claimed, and which are illustrated in the accompanying drawing which is an elevation of a pinion constructed according to my invention, with a part broken away, and intermeshed with teeth of a driven gear, a part only of the latter being shown.

Referring first to the gearing shown in said drawing, the numeral 1 denotes a driven gear-wheel provided with the special teeth 2 separated by the semi-circular interspaces or roots 3. My improved driving pinion is built up from parts constituting supporting-means and rollers mounted rotatably therearound.

A medial body 4 has equally spaced semicylindrical hollows in the desired number about its outer edge, shown at 5, and in said hollows are seated the rollers 6 rotatably but not directly connected to said body. The plates 8 are detachably secured to opposite outer faces of the body 4 by means of screws 9.

The rollers 6 are contained and held in position from escaping from the outer plates 8 by means of inwardly-directed annular concentric flanges 11 on said plates which limit outward radial movements of the rollers from the body 4.

The rollers 6 intermesh in turn with the semi-circular interspaces or roots 3 of the gear-teeth 2, and this form of gearing presents the following advantages over the ordinary type of fixed tooth spur-gears. The gear-wheel may have its teeth finished on any ordinary drill press, which insures perfection and reduces expense.

Again, in the gear 1, the semi-circular seats 3 for the rollers 6 afford much greater strength to the teeth 2. The action of the gear teeth on the rollers is a shear strain, not a cleavage-producing leverage, which insures freedom from breakage. The rollers possess some play in their bearings, so cannot bind the gear 1 as with ordinary gearing, and this reduces friction and loss of power. When rollers are worn too much, they may be readily replaced.

This improved form of gearing may be applied in practice to any type of gearing where it may be applicable.

Having described my invention, what I claim as new, and desire to secure by Letters Patent, is:

1. In gearing, intermeshed gears, one gear having teeth separated by semi-circular roots, the other gear being composed of a central body having marginal seats, rollers mounted loosely in said seats and intermeshed with roots of teeth on the first-mentioned gear, and cover-plates detachably secured to opposite faces of said central body and provided with rigid integral means for retaining said rollers in their seats.

2. In gearing, intermeshed gears, one gear having teeth separated by semi-circular roots, the other gear being composed of a central body having marginal seats, rollers mounted loosely in said seats and intermeshed with roots of teeth on said first-mentioned gear, cover-plates detachably secured to opposite faces of said central body, said plates having inwardly-directed concentric annular flanges surrounding the end-parts of said rollers in spaced relation from each other to prevent egress of the rollers from their seats.

Signed at Delhi, Iowa, this 12th day of December, 1918.

MOREL G. ALBROOK.